United States Patent [19]
Wachman et al.

[11] Patent Number: 5,841,577
[45] Date of Patent: Nov. 24, 1998

[54] LIGHT MICROSCOPE HAVING ACOUSTO-OPTIC TUNABLE FILTERS

[75] Inventors: Elliot S. Wachman; Daniel L. Farkas; Wen-Hua Niu, all of Pittsburgh, Pa.

[73] Assignee: Carnegie Mellon University, Pittsburgh, Pa.

[21] Appl. No.: 603,030

[22] Filed: Feb. 16, 1996

[51] Int. Cl.$^6$ ............................... G02B 21/06; G02F 1/33
[52] U.S. Cl. .......................... 359/386; 359/308; 359/371; 359/495
[58] Field of Search .................................... 359/244–247, 359/285–287, 305–308, 368–372, 385–389, 494–496, 502, 618

[56] References Cited

U.S. PATENT DOCUMENTS

| | | | |
|---|---|---|---|
| 2,674,157 | 4/1954 | Heine | 359/370 |
| 4,560,278 | 12/1985 | Schinozaki et al. | 356/364 |
| 4,806,004 | 2/1989 | Wayland | 359/389 |
| 4,883,963 | 11/1989 | Kemeny et al. | 250/339 |
| 4,896,949 | 1/1990 | Melamed et al. | |
| 4,940,316 | 7/1990 | Brandt . | |
| 5,120,961 | 6/1992 | Levin et al. | 250/339 |
| 5,131,742 | 7/1992 | Schaff | 356/73 |
| 5,251,057 | 10/1993 | Guerin | 359/305 |
| 5,377,003 | 12/1994 | Lewis et al. | 356/300 |
| 5,497,295 | 3/1996 | Gehly | 362/32 |
| 5,556,790 | 9/1996 | Pettit | 436/513 |

FOREIGN PATENT DOCUMENTS 60-80821   5/1985   Japan ..................................... 359/368

OTHER PUBLICATIONS

R. Nitschke, et al., Applicants of Electro–Optic and Laser Technology to Fluorescnece Microscopy, Quels '95/Summaries of papers presented at the Quantum Electronics and Laser Science Conference, vol. 16, 1995.

Elliot S. Wachman, et al., Imaging Acousto–Optic Tunable Filter with 0.35–Micrometer Spatial Resolution, Applied Optics, vol. 35, No. 25, 1 Sep. 1996.

Article Entitled "Technical Support Package, Compact, Automated, Frequency–Agile Microspectrofluorimeter," National Aeronautics and Space Administration, NASA Tech Briefs KSC–11611, Aug., 1995.

G. Gao and Z. Lin, "Acouto–optic Supermultispectral Imaging," Appl. Opt. 32, 3081–3086 (1993).

L. Cheng, T. Chao, M. Dowdy, C. LaBaw, C. Mahoney, and G. Reyes, "Multispectral Imaging Systems Using Acousto–optic Tunable Filter," Proc. Soc. Photo–Opt Instrum. Eng. 1874, 224–231 (1993).

T. Chao, G. Reyes, E. Hegbloom and L. Cheng, "Spatial–spectral Optical Pattern Recognition Using an Acousto–optic Tunable Filter Preprocessor," Proc. Soc. Photo–Opt. Instrum. Eng. 1959, 410–415 (1993).

R.B. Wattson, S.A. Rappaport, and E.E. Frederick, "Imaging Spectrometer Study of Jupiter and Saturn," Icarus 27, 417–422 (1976).

(List continued on next page.)

*Primary Examiner*—Thong Nguyen
*Attorney, Agent, or Firm*—Kirkpatrick & Lockhart LLP

[57] ABSTRACT

A light microscope comprises a light source and a first acousto-optic tunable filter responsive to the light source for producing two light streams of different polarization. A control circuit is provided for tuning the first filter to a plurality of frequencies. A mechanism, such as steering optics, is provided for combining the two light streams into a combined light stream. Input optics focus the combined light stream. A condenser, such as a darkfield condenser, receives the focused, combined, light stream and projects it onto a sample. A second acousto-optic tunable filter is responsive to light from the sample. A second control circuit is provided for tuning the second acousto-optic filter to a plurality of frequencies. The light from the second acousto-optic tunable filter may be captured and stored for future processing.

42 Claims, 10 Drawing Sheets

OTHER PUBLICATIONS

W.H. Smith, "Spectral Differential Imaging Detection of Planets About Nearby Stars," Publ. Astron. Soc. Pacif. 99, 1344–1353 (1987).

W.H. Smith and K.M. Smith, "A Polarimetric Spectral Imager Using Acousto–optic Tunable Filters," Exp. Astr. 1, 329–343 (1991).

D.A. Glenar, J.J. Hillman, B. Seif, and J. Bergstralh, "Acoustic–optic Imaging Spectropolarimetry for Remote Sensing," Appl. Opt. 33, 7412–7424 (1994).

H.R. Morris, C.C. Hoyt and P.J. Treado, "Imaging Spectrometers for Fluorescence and Raman Microscopy: Acousto–optic and Liquid Crystal Tunable Filters," Appl. Spectr. 48, 857–866 (1994).

P.J. Treado, I.W. Levin and E.N. Lewis, "High–Fidelity Raman Imaging Spectrometry: A Rapid Method Using an Acousto–optic Tunable Filter," Appl. Spectr. 46, 1211–1216 (1992).

M.D. Schaeberele, J.F. Turner II, and P.J. Treado, "Multiplexed Acousto–optic Tunable Filter Spectral Imaging Microscopy," Proc. Soc. Photo–Opt. Instrum. Eng. 2173, 11–20 (1994).

I. Kurtz, R. Dwelle and P. Katzka, "Rapid Scanning Fluorescence Spectroscopy Using an Acousto–optic Tunable Filter," Rev. Sci. Instrum. 58, 1996–2003 (1987).

P. Treado, I. Levin, E. Lewis, "Near–Infrared Acousto–optic Filtered Spectroscopic Microscopy: A Solid–State Approach to Chemical Imaging," Appl. Spectr. 46, 553–559 (1992).

K. Spring, P. Smith, "Illumination and Detection Systems for Quantitative Fluorescence Microscopy," Royal Microscopical Society, 265–278 (1987).

J. Hallikainen, J.P.S. Parkkinen, and T. Jaaskelainen, "Color Image Processing With AOTF," Proceeding of 6th Scandinavian Conference on Image Analysis; Oulu, Finland; Jun. 19–22, 1989, vol. 1, M. Pietikainen and J. Roning, eds., 294–300 (1989).

T. Chao, J. Yu, L. Cheng, and J. Lambert, "AOTF Imaging Spectrometer for NASA Applications: Breadboard Demonstration," Proc. Soc. Photo–Opt. Instrum. Eng. 1347, 655–663 (1990).

D.A. Glenar, J.J. Hillman, B. Seif, and J. Bergstrahl, "Polaris II: An Acousto–optic Imaging Spectropolarimeter For Ground Based Astronomy," Polarization and Remote Sensing, W.G. Egan, ed., Proc. Soc. Photo–Opt. Instrum. Eng. 1747, 92–101 (1992).

I.C. Chang, "Electronically Tuned Imaging Spectrometer Using Acousto–optic Tunable Filter," Proc. Soc. Photo–opt. Instrum. Eng. 1703, 24–29 (1992).

D.R. Suhre, M. Gottlieb, L.H. Taylor, and N.T. Melamed, "Spatial Resolution of Imaging Noncollinear Acousto–optic Tunable Filters," Opt. Eng. 31, 2118–2121 (1992).

Y. Chi, D.Cui, and J. Tang, "Study on the Characteristics of an Imaging Spectrum System by Means of an Acouto–optic Tunable Filter," Opt. Eng. 32, 2899–2902 (1993).

LIGHT MICROSCOPE HAVING ACOUSTO-OPTIC TUNABLE FILTERS

BACKGROUND OF THE INVENTION

Cross Reference to Related Application

This application is related to U.S. patent application Ser. No. 08/603,035 entitled Submicron Imaging System Having An Acousto-Optic Tunable Filter filed Feb. 16, 1996 by the same inventors.

FIELD OF THE INVENTION

The present invention is directed to optical microscopes and, more particularly, to the filters used with optical microscopes.

DESCRIPTION OF THE BACKGROUND

The light or optical microscope has been a standard tool of the cell biologist for three hundred years. Since the middle of this century, however, other tools and techniques have challenged the optical microscope's position as the preeminent tool of the biologist. Biochemistry has developed techniques to chemically dissect specimens so that how a cell is assembled and how a cell reacts can be deduced by responses to certain chemicals. Genetic techniques have been added to the chemical techniques to enable researchers to infer how cells are assembled and operate. The electron microscope, with its higher resolving power, has revealed detail not producible with light microscopes.

Those new techniques and instruments, however, have their own drawbacks and limitations. Methods of chemically analyzing or genetically analyzing a sample do not result in images which can be examined, thereby leaving the researcher to infer how the cell came to be in a second state from a first state. The electron microscope requires that the specimen be dried and placed in a high vacuum. For that reason, the electron microscope is used to examine primarily dead specimens such that the researcher is again left to guess at the mechanisms which enable a cell to change from one state to another.

Two advances in technology have lead to a resurgence in light microscopy. The first advance relates to the proliferation of computers as well as the technology for digitizing images. It has long been the practice of researchers to connect cameras to microscopes to produce images which can be studied later. With the availability of low-cost hardware for digitizing images as well as low-cost computers, it is now possible to connect a computer to a microscope and produce digitized images which can be stored for later examination. In addition to storing digitized images, the computer may be used to enhance the images or to automatically search for similarities and differences among a series of images.

The second advance lies in the area of multi-color fluorescent dyes. Fluorescent dyes are designed to attach themselves to specific molecular structures. The dye then, by various mechanisms intrinsic or induced, causes that cell structure to fluoresce. By capturing that fluorescent light, an image of the cell structure of interest can be created. Thus, not only the cell structure, but its location within the cell can be identified. More importantly, dyes can be constructed which cause the particular structure to which they are attached to fluoresce in response to a specific physiological change. Such dyes thus give information of what types of changes are occurring within a cell, where they are occurring, and when they occur. The use of such fluorescent dyes with light microscopes is referred to as fluorescence microscopy.

Because of the ability to cause cells or cell structures to fluoresce in response to biological changes, fluorescence microscopy has been challenged to provide a dynamic instrument capable of sampling multiple spectral parameters. In current, high-speed, multi-spectral applications, discrete filters are incorporated into filter wheels. Because excitation and detection occurs at two distinct wavelengths, a filter wheel is provided in the excitation system and another filter wheel is provided in the imaging system. As the filter wheels are rotated, different filters are placed into the light stream thereby allowing analysis at different spectral parameters.

Mechanical filter wheels have several drawbacks. First, a filter wheel of any given size can carry only a limited number of discrete filters thereby limiting the number of spectral parameters that can be investigated. Radiation can be discriminated only when the filters are at rest, thereby limiting the timing resolution of the instrument. Finally, precise registration between images of a sample taken at different wavelengths is required to create a multicolor composite image. That is not possible with a mechanical filter wheel, and image post-processing is usually necessary to achieve such results.

To overcome the drawbacks of mechanical filter wheels, acousto-optic tunable filters (AOTF) have been investigated. At least as early as 1987, AOTFs had been proposed for use in connection with fluorescence spectroscopy as a replacement for mechanical wheels. See Kurtz et al., "Rapid Scanning Fluorescence Spectroscopy Using An Acousto-Optic Tunable Filter", Rev. Sci. Instrum. 58 (11), Nov. 1987, p. 1996–2003. AOTFs have also been proposed for use in illumination systems, Spring, "Illumination And Detection Systems For Quantitative Fluorescence Microscopy", Royal Microscopical Society, 1987, p. 265–279, and in imaging systems, Morris et al., "Imaging Spectrometers For Fluorescence And Raman Microscopy: Acousto-Optic And Liquid Crystal Tunable Filters", Applied Spectroscopy, Vol. 48, No. 7, 1994, p. 857–866. The latter article by Morris et al. contains a side-by-side comparison of AOTF and liquid crystal tunable filter technologies as applied to fluorescence microscopy.

While such technologies eliminate the mechanical parts associated with filter wheels, and also eliminate timing and registration problems, such tunable filters typically are inferior to mechanical filters with respect to eliminating out-of-band illumination, overall throughput and, for imaging systems, image clarity. For example, the elimination of out-of-band frequencies in conventional mechanical filters is on the order of $10^{-5}$, whereas the elimination of out-of-band frequencies for AOTFs is on the order of $10^{-2}$ or $10^{-3}$. Additionally, with mechanical filters, spatial resolution of under 0.3 microns is typical whereas the best spatial resolution previously reported using AOTF's is 8–10 microns. For those reasons, mechanical filters are still commonly used. Thus, the need exists for a system which provides the benefits of no moving parts, with maximum spectral versatility and minimal timing and registration problems, while at the same time optimizing throughput, reducing background, and providing the same image sharpness as obtained by using conventional fluorescence microscopes equipped with mechanical filter wheels.

SUMMARY OF THE INVENTION

The present invention is directed to a light microscope having a light source and an acousto-optic tunable filter responsive to the light source for producing two light streams of different polarization. A control circuit is provided for tuning the acousto-optic filter. In one embodiment, steering optics are used to combine the two light streams into a combined light stream. Input optics focus the combined light stream onto a sample, in one embodiment, preferably through a dark-field condenser. Imaging optics are responsive to light from the sample for producing an image therefrom. The image may be filtered and saved for later processing. According to one embodiment of the invention, the image may be filtered through a second AOTF, captured by a CCD camera, and saved for later processing.

As mentioned, two of the primary difficulties with using acousto-optic tunable filters on light microscopes are the limited amount of light which can be passed through the filter and the leakage light, i.e., the amount of out-of-bandwidth light. According to one embodiment of the present invention, those obstacles can be greatly reduced by combining the two light streams of different polarization produced by the acousto-optic tunable filter and using a dark-field condenser. In addition, the light microscope disclosed and claimed herein produces images having substantially the same degree of spatial resolution as those produced by microscopes using mechanical filters.

The light microscope of the present invention enjoys all of the benefits which flow from the use of acousto-optic tunable filters. Hence, for example, the light microscope of the present invention can switch quickly between light of different frequencies to investigate transitions as they occur. In addition, the excitation and imaging filters may be swiftly turned on and off one after the other to measure time-delayed luminescence from cell structures labelled with luminescent probes.

Finally, spectral versatility is greatly increased. In particular, dyes which are designed to fluoresce at given frequencies may have their peak fluorescence above or below the expected frequency due to interaction with the sample or the medium. Additionally, the frequency at which peak fluorescence occurs may change from sample to sample or media to media. The AOTFs allow the excitation and imaging spectra to be empirically tuned to match such changes thereby enabling the amount of light collected from the sample to be optimized, enhancing image quality. Those advantages and benefits of the present invention, as well as others, will become apparent from the Description of the Preferred Embodiments hereinbelow.

BRIEF DESCRIPTION OF THE DRAWINGS

The file for this patent contains at least one drawing executed in color.

For the present invention to be clearly understood and readily practiced, the present invention will be described in conjunction with the following figures wherein.

DESCRIPTION OF THE PREFERRED EMBODIMENTS

Figure 1:
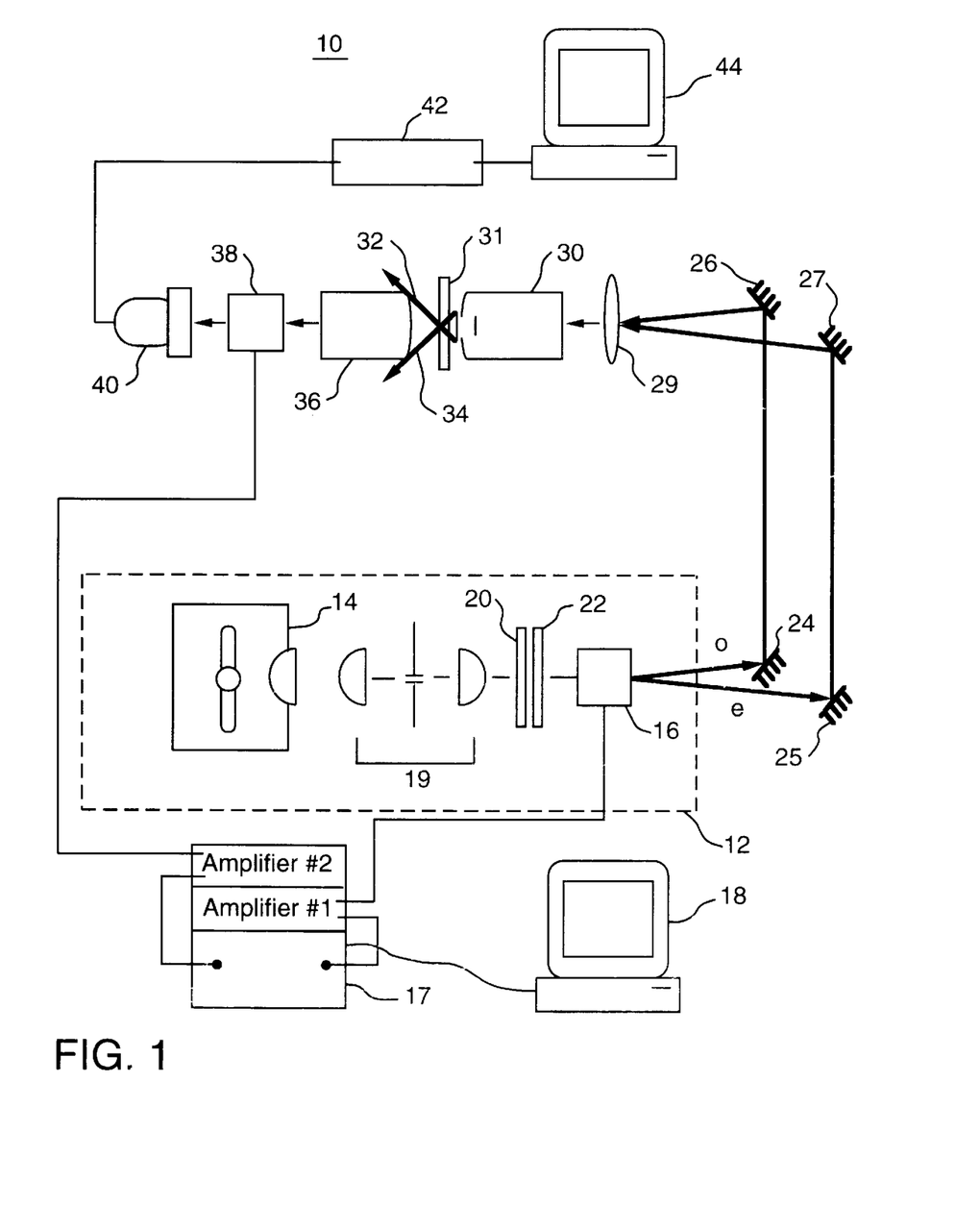
FIG. 1 illustrates a light microscope constructed according to the teachings of the present invention.

FIG. 1 illustrates a light microscope 10 constructed according to the teachings of the present invention. The light microscope 10 has an excitation portion 12 which includes an excitation source 14. Because of the losses inherent in acousto-optic tunable filters and optics traditionally used in microscopes, it is necessary to provide a powerful, point light source so as to provide sufficient illumination to illuminate the sample. In one embodiment, a light source 14 which is a 500 watt xenon arc lamp having a short arc, e.g. an arc length of less than one millimeter, is used. A multiline laser source may also be used.

The excitation portion 12 includes an acousto-optic tunable filter (AOTF) 16. The AOTF 16 is tuned by an arbitrary wave-form generator 17 through the first of two independent output amplifiers. An AOTF control work station 18 may be provided for controlling the wave-form generator 17 and for viewing the signals applied to the AOTF 16. It is desirable under certain circumstances, as will be discussed in greater detail hereinbelow, to multiplex the signals which are applied to tune AOTF 16. By multiplexing signals, the band of frequencies passed by the filter 16 can be increased.

It is known that acousto-optic tunable filters can be damaged if appropriate precautions are not taken. Also, it is desirable to process the light so that the rays are essentially parallel to one another. Accordingly, interposed between light source 14 and AOTF 16 are spatial filter 19, infrared filter 20, and ultraviolet filter 22.

The light produced by light source 14, after passing through filters 19, 20, and 22, is input to the AOTF 16. The AOTF 16 produces two streams of light, one o-polarized and one e-polarized. Steering optics, which may take the form of mirrors 24, 25, 26, and 27, steer the two light streams of different polarization so as to combine the two light streams into a combined stream directed to the microscope's input optics 29. It is anticipated that the function provided by the steering optics could also be performed by conductive optic fibers.

The combined light stream, after leaving input optics 29, is input to a dark-field condenser 30. A sample (not shown) is held in a sample plane 31, by conventional means. The combined light stream output from the dark-field condenser 30, illuminates the sample in a manner such that the excitation radiation, represented by rays 32 and 34, falls outside of the scope of an objective lens 36. In that manner, the excitation illumination is separated from the fluorescence of the sample so that out-of-bandwidth radiation is minimally commingled with fluorescence from the sample.

The objective lens 36 produces an image of the sample which may be filtered by a second acousto-optic tunable filter 38. The AOTF 38 is tuned by the generator 17 through the second of the independent output amplifiers. After the image has been filtered, it may be captured, for example, by a charge coupled device (CCD) 40. The CCD 40 is under the control of a controller 42 which is in communication with an image processing work station 44. The CCD device 40 may capture the image which is stored in the image processing workstation 44. A CCD controller 42 is also provided. After the image has been stored, known software routines for examining the image, or for further processing the image, may be performed.

Figure 12A:
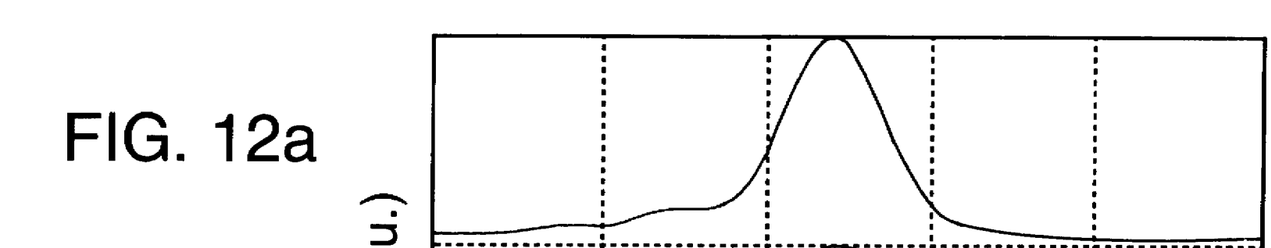
FIGS. 12a–12c illustrate electronic control of AOTF filter bandwidth.
Figures 12B, 12C:
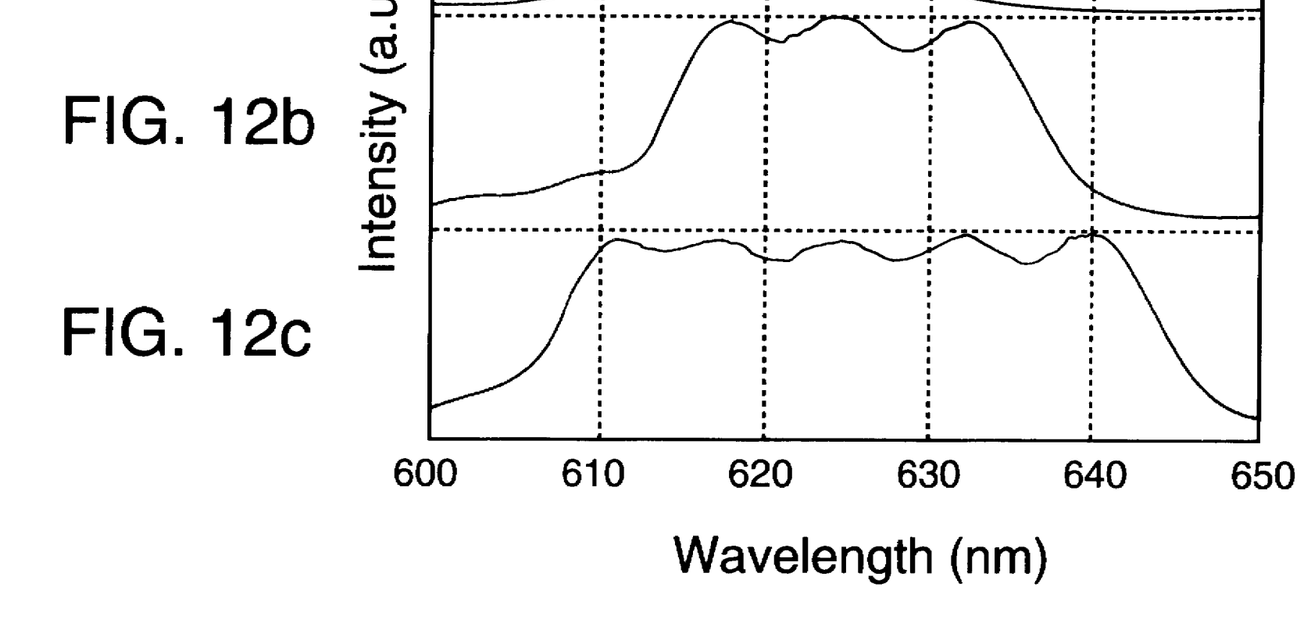
Figure 13:
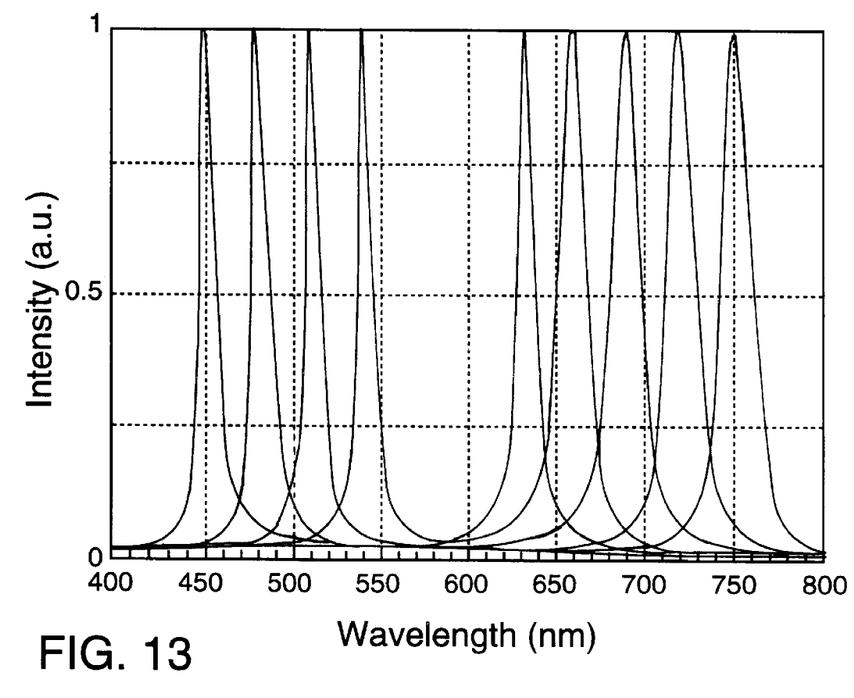
FIG. 13 is an illustration of the electronic control of AOTF filter bandwidth.

The excitation AOTF 16 may be implemented by a first crystal while the emission AOTF may be implemented by a second crystal satisfying the following parameters and available from NEOS Technologies:

wavelength graphs for one frequency (FIG. 12a, $\Delta\lambda=7.5$ nm), three frequencies (FIG. 12b, $\Delta\lambda=23$ nm), and five frequencies (FIG. 12c, $\Delta\lambda=37$ nm). FIG. 13 demonstrates the broad electronic tuning of the crystal throughout the visible spectrum.

Figure 2:
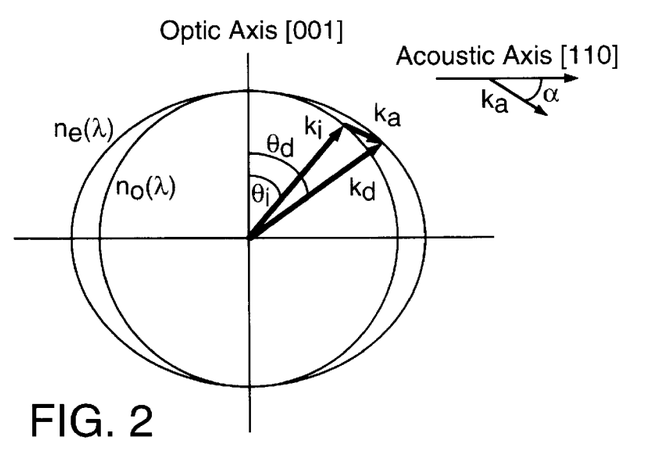
FIG. 2 illustrates phase-matching in a noncolinear AOTF.

The interaction of acoustic and optical plane waves in an anisotropic medium may be described by a pair of coupled differential equations. Useful solutions to these equations occur when the phase-matching conditions are satisfied:

$$k_d = k_i + k_a \quad (1)$$

where $k_d = 2\pi n_d/\lambda$, $k_i = 2\pi n_i/\lambda$, and $k_a = 2\pi F/V$, with F the acoustic frequency, V the acoustic speed in the crystal, $\lambda$ the optical wavelength, and $n_{i,d}$ the crystal indices of refraction for the incident and diffracted beams, respectively. For the case of an o-polarized incident wave (this is the preferred polarization for imaging in a $TeO_2$ AOTF), equation (1) may be rewritten as the following two phase matching equations, both of which are referred to as equation 2:

$$n_e(\lambda,\theta_d)\cos(\theta_d) - n_o(\lambda)\cos(\theta_i) + F\lambda/V \sin(\alpha) = 0$$

$$n_e(\lambda,\theta_d)\sin(\theta_d) - n_o(\lambda)\sin(\theta_i) - F\lambda/V \cos(\alpha) = 0 \quad (2)$$

where $\theta_i$ and $\theta_d$ are the angles between the incident and diffracted beam wave-vectors and the optic axis, $n_e$ and $n_o$ are the extraordinary and ordinary indices of refraction, and $\alpha$ is the angle between the acoustic wave-vector, $k_a$, and the acoustic axis, as shown in FIG. 2. These equations determine the spectral tuning characteristics of AOTFs.

Figure 3:
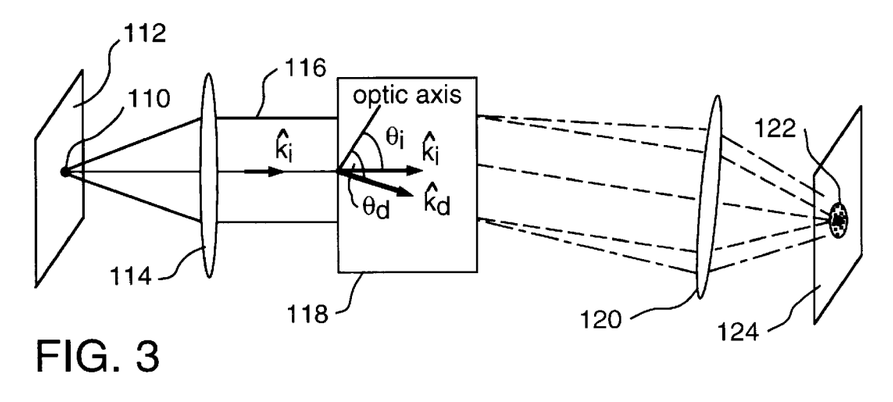
FIG. 3 illustrates the light path in an ideal AOTF imaging system.

For AOTF imaging applications, image fidelity must also be considered. The use of an AOTF as an imaging filter for o-polarized white light is illustrated in FIG. 3. A sample 110

| Crystal # | Aperture | W | H | L | $\theta_i$ | $\theta_a$ | $\theta_f$ | Transducer Length | Frequency Range |
|---|---|---|---|---|---|---|---|---|---|
| 16 | 25 mm | 30 mm | 27 mm | 34 mm | 8° | 3.95° | 10.95° | 15 mm | 34–81 MHz |
| 38 | 17 mm | 22 mm | 22 mm | 48 mm | 12° | 5.9° | 16.35° | 27 mm | 48–107 MHz |

Figures 14A, 14B:
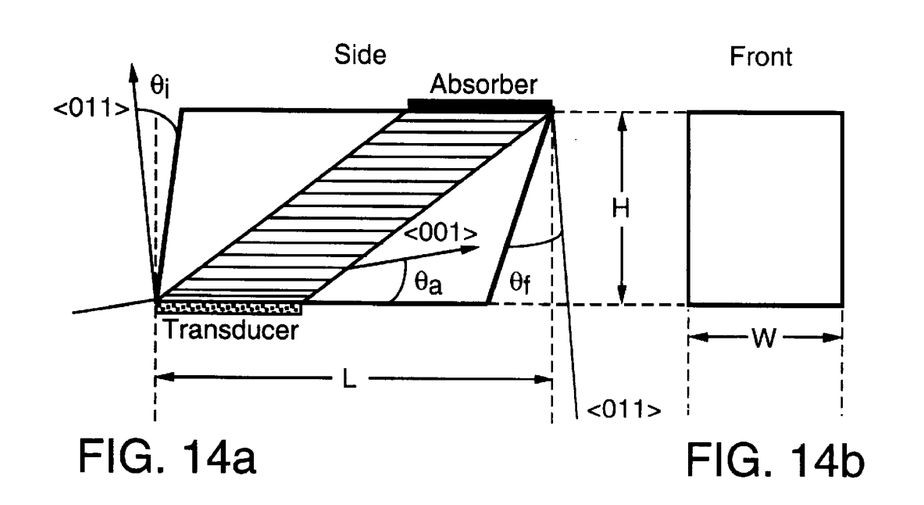
FIGS. 14a and 14b define the AOTF parameters.

The AOTF parameters in the preceding table are defined in FIGS. 14a and 14b. The AOTF's 16 and 38, under the control of workstation 18 as shown in FIG. 1, can provide rapid wavelength switching, rapid shuttering, and control over the intensity of the excitation radiation.

Theoretical Background

The presence of an acoustic wave inside a medium creates a periodic modulation of its index of refraction via the elasto-optic effect. This modulation acts as a three-dimensional sinusoidal phase grating for light incident on the crystal, leading to diffraction of certain wavelengths at an angle from the incident beam direction. In an acousto-optic tunable filter, this diffracted light is used as the filter output, and the grating frequency is electronically controlled by varying the RF frequency applied to a piezoelectric transducer bonded to one of the faces of the crystal. That results in an all-electronic, broadly tunable spectral filter with tuning speeds determined by the acoustic transit time in the crystal (typically under 50 $\mu$s).

When driven with multiple closely-spaced RF frequencies, the AOTF also provides electronically variable bandwidth control. As shown in FIGS. 12a–12c, combinations of frequencies can be used to increase the light throughput of the crystal. FIG. 12 illustrates intensity versus to be imaged lies in a sample plane 112. Light fluorescing from the sample 110 is input to input optics 114 which produce O-polarized collimated light represented by light rays 116. The light rays 116 are input to an AOTF 118 which produces e-polarized detracted beams at wavelengths $\lambda$. The diffracted beams at wavelength $\lambda$ are input to output optics 120 which focus an image 122 onto an image plane 124.

In the configuration illustrated in FIG. 3, every point on the sample 110 gives rise to a bundle of multichromatic parallel rays 116 incident on the crystal 118 at a single angle $\theta_i$. Ideally, as shown by the dashed lines in FIG. 3, the diffracted portion of this bundle should exit the crystal 118 as a bundle of monochromatic parallel rays described by a unique $\theta_d$. In that case, each point on the sample plane 112 will map to a single point on the image plane 124. In practice, however, it is found that the diffracted ray bundle consists of rays leaving the crystal 118 over a range of different output angles as indicated by the dashed-dot lines in FIG. 3. As a result, each sample plane point maps to a distribution of image plane points, leading to a blurred image even for fixed frequency operation.

A second image degrading effect, image shift, occurs when the radio frequency, F, is varied. The phase matching equations (2) dictate that changes in F result in changes in both the wavelength, $\lambda$, and the diffracted angle, $\theta_d$, for fixed $\theta_i$ and $\alpha$. That leads to a shift in image position for different wavelengths. An appropriate cut of the crystal exit face, however, can eliminate that almost entirely.

Because the transducer (not shown in FIG. 3) attached to the AOTF 118 is of finite length, the acoustic field it produces may be described as a superposition of plane waves at various acoustic angles, α. For white light illumination at a given operating frequency, F, and incident beam direction, $\theta_i$, each α will produce a diffracted output at a distinct angle $\theta_d$ and wavelength λ. The spread in acoustic angle resulting from the finite transducer length consequently gives a diffracted output containing a range of angles and wavelengths, even for fixed incident beam direction, resulting in a filtered image which is blurred. AOTF image blur is, therefore, primarily attributable to acoustic beam divergence in the crystal.

For negligible incident light depletion (an approximation valid for AOTF efficiencies up to about 70%), the relationship between the acoustic angle intensity spectrum and the diffracted output intensity spectra may be derived explicitly for plane waves from the AOTF interaction equations. For fixed F and $\theta_i$ we have:

$$I_{out}(\lambda,\theta_d) = C^2 \times I_{inc}(\lambda) \times I_\alpha(\alpha) \times \delta[K_d(\theta_d,\lambda) - K_d(\theta_i,\lambda) - K_a(\alpha,F)] \quad (3).$$

In this equation, $I_{out}$ is the diffracted intensity; C is a constant; $I_{inc}$ is the wavelength spectrum of the incident light; $I_\alpha$ is the acoustic angle intensity spectrum, proportional to the squared magnitude of the Fourier transform of the transducer profile in the direction of light propagation; and the delta function, δ, expresses the phase matching requirement. In the case of white light illumination ($I_{inc}$= constant), this equation shows that the diffracted intensity is directly proportional to the acoustic angle spectrum:

$$I_{out} \sim I_\alpha(\alpha). \quad (4)$$

Because both λ and $\theta_d$ are functions of α via the phase-matching equations (2), $I_{out}$ can be expressed either in terms of wavelength or in terms of output angle. When expressed in terms of wavelength, $I^\lambda_{out}(\lambda)$, it may be identified as the bandpass profile of the filter; when expressed in terms of angle, $I^{\theta_d}_{out}(\theta_d)$, it may be interpreted as the image blur profile. This equation shows that both of these are determined by the Fourier transform of the transducer structure.

The importance of the acoustic angle distribution on the spectral bandpass of an AOTF is well-known but has not been thoroughly investigated because for the majority of imaging AOTFs operating with a 10 μgm or greater spatial resolution, the effect of the acoustic angle distribution on image quality is insignificant. However, for an image resolution of a few microns or less, as needed in microscopy, this effect becomes highly significant. The following experimental setup was designed to quantify this effect.

Experimental Setup

Figure 4:
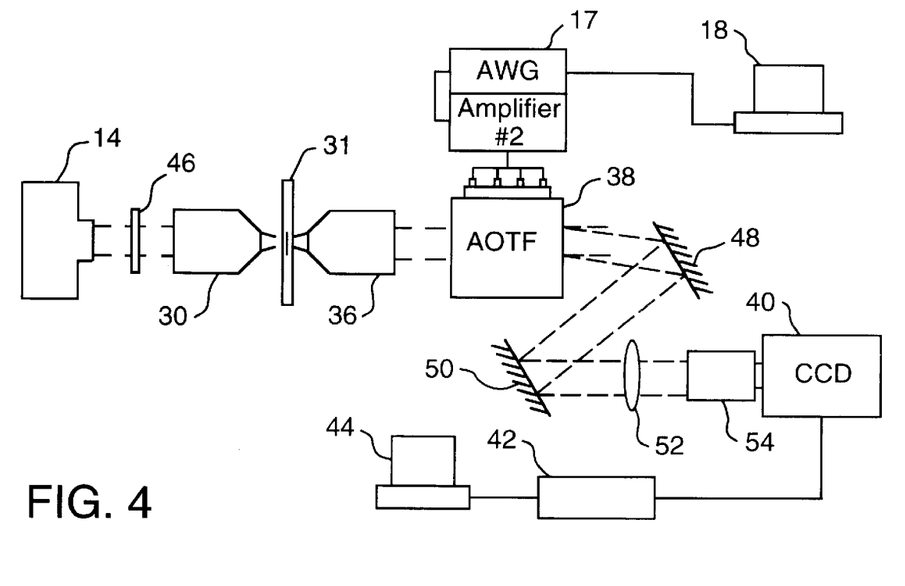
FIG. 4 is a schematic of a light microscope incorporating an imaging system constructed according to the teachings of the present invention which was used to conduct tests.

FIG. 4 is a schematic of a light microscope incorporating an imaging system constructed according to the teachings of the present invention which was used to conduct tests. In FIG. 4, components performing the same function as those identified in conjunction with FIG. 1 carry the same reference numeral. In FIG. 4, the arc lamp 14 produces light which passes through an excitation filter 46 before being input to the dark-field condenser 30. Light from the dark-field condenser 30 is used to illuminate a sample (not shown) held in the sample plane 31. The objective lens 36 is responsive to the light fluoresced by the sample. The light gathered by the objective lens 36 is input to the second AOTF 38 which is under the control of the arbitrary waveform generator 17 and the AOTF work station 18.

The light output from the AOTF 38 passes through steering optics, i.e., mirrors 48, 50, to a tube lens 52 and a two power coupler 54 before being input to the CCD camera 40. The CCD camera 40 is under the control of the CCD controller 42 and the imaging work station 44.

The AOTF crystal used for filter 38 consists of a five centimeter long $TeO_2$ crystal with an optical aperture of seventeen millimeters, cut for an incident optical angle of twelve degrees and an acoustic angle of 5.95°. The exit face angle is cut at 16.35° to eliminate image shift. The transducers is sectioned into seven slices, each 0.33 cm in width. The transducer has four independent input ports: three ports are connected to two slices each, and one is connected to a single slice. The main outstanding feature of that design is the crystal's unusual length and its impact on device performance as will be described in detail below.

Drive electronics are controlled by a Macintosh IIci computer 18 and include a 400 MHz Arbitrary Waveform Generator 17 (LeCroy model LW420) and a single channel four-output broadband RF amplifier (amplifier #2) with four watt maximum total output (NEOS Technologies). Operation is possible from 50–110 MHz, corresponding to diffracted optical wavelengths between 450–800 nm.

The AOTF 38 is installed behind the objective lens 36 in a research-grade fluorescence microscope (Zeiss Axioplan). Sample, illumination is performed in transmission using either a seventy-five watt xenon or one hundred watt mercury arc lamp (Zeiss). For the fluorescence measurements, a standard rhodamine excitation interference filter 46 is also used (Omega, 540DF19). Microscope optics include a dark-field condenser 30 (Zeiss part no. 445315; minimum NA=1.2, maximum NA=1.4), and 40× and 100× oil-immersed iris objectives 36 (Olympus UApo 340(40×), 0.65<NA<0.35; and UPlanFl(100×), 0.6<NA<1.3). Dark-field optics are used to compensate for the inadequate background rejection of the present AOTF crystal 38.

Images are recorded using a CCD camera 40 with a 1317×1035 array of 6.8 μm square pixels (Princeton Instruments model CCD 1317-K; Kodak KAF1400 CCD array) coupled to the microscope with a two power coupler 54 (Diagnostic Instruments model HRP-200). Images are stored and processed on a Macintosh 7100 computer 44.

Figure 5:
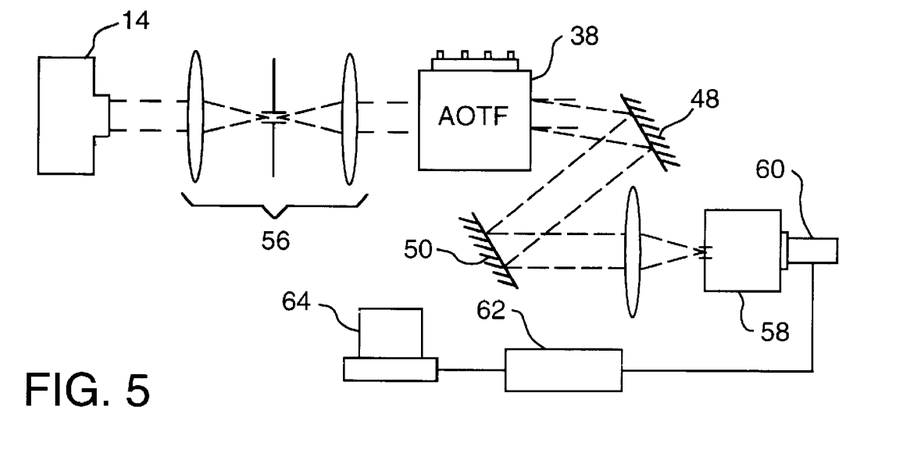
FIG. 5 is an experimental setup to perform wavelength measurements outside the microscope of FIG. 4.

Wavelength measurements are performed outside the microscope of FIG. 4 with the apparatus shown in FIG. 5. The seventy-five watt xenon lamp 14 is followed by a spatial filter 56 with a tightly closed iris at its focus which produces nearly parallel rays of white light at the entrance to the AOTF 38. The diffracted beam leaving the AOTF crystal 38 is directed into an optical multichannel analyzer consisting of a ¼-m monochromator 58 (Photon Technology International) and silicon array detector 60 (EG&G model 1420 with EC&G model 1461 controller 62) under computer 64 control.

Experimental Results

The diffracted intensity distribution from an AOTF, Iout (λ,θd), is ultimately determined by the topology of its transducer. To experimentally demonstrate this relationship, we placed opaque 0.121 μm diameter polystyrene beads (Molecular Probes, Inc.) in the sample plane 31 of the set-up shown in FIG. 4. When excited with the seventy-five watt xenon lamp, each bead appears as a quasi-point source of white light through the infinity-corrected optics of the microscopy. That gives rise to a bundle of nearly parallel rays at $\theta_i$ entering the AOTF 38. For a given operating frequency, therefore, the resulting AOTF output is well described by the diffracted intensity distribution $I_{out}$ of equation (4). Changing the transducer profile by disconnecting one or another of the transducer ports should consequently result in substantially different AOTF bead images.

Figure 6A:
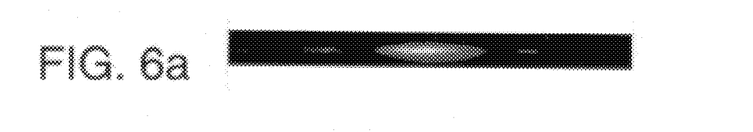
FIGS. 6a through 6c illustrate three photographs of dark-field images of 0.121 micron opaque beads taken at a frequency of 74 MHz using one (FIG. 6a), two (FIG. 6b), and six (FIG. 6c) transducer slices corresponding to transducer lengths of 0.33 micron, 0.66 micron, and 1.98 micron, respectively.
Figure 6B:
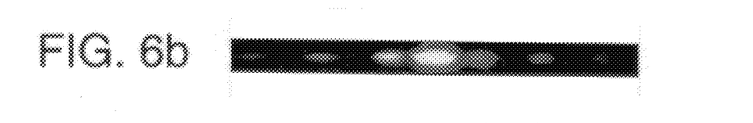
Figure 6C:
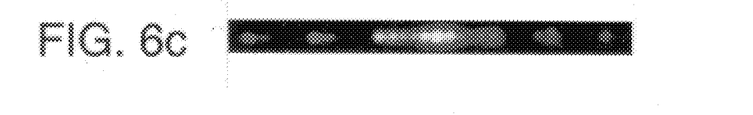

Dark-field images of the single 0.121 μm diameter bead taken through the AOTF 38 with a 40× objective 36 are shown in FIGS. 6a–6c for one, two, and six transducer slices, respectively, corresponding to transducer lengths of 0.33 μm, 0.66 μm, and 1.98 μm, respectively. The images were taken with the AOTF 38 operating at a frequency of 74 MHz and an efficiency of approximately 60%. The color scale in FIGS. 6a–6c is not linear. The center bright spot in each figure represents the primary AOTF image of the bead; the narrower this spot, the better the AOTF resolution. The increase in resolution with longer transducer length expected from equation (4) is clearly evident. The center spot in FIG. 6c, produced by six transducer slices, corresponds to a resolution of 1 μm. The secondary spots on either side of the center arise from the sidelobes in the transducer Fourier transform. These are reduced in intensity relative to the main peak by one to two orders of magnitude. Note the differences in number, placement, and relative intensity of the sideband peaks for each of the various transducer configurations of FIGS. 6a, 6b, and 6c.

Figure 7A:
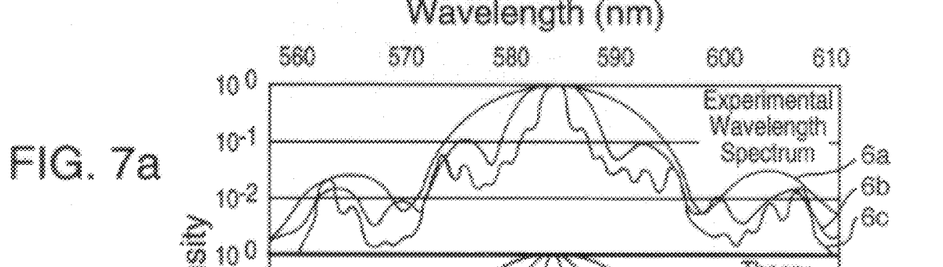
FIGS. 7a through 7c are graphs illustrating intensity versus wavelength data (FIG. 7a), intensity versus angle data (FIG. 7c), and theoretical results (FIG. 7b for the three different images of FIGS. 6a–6c.
Figure 7B:
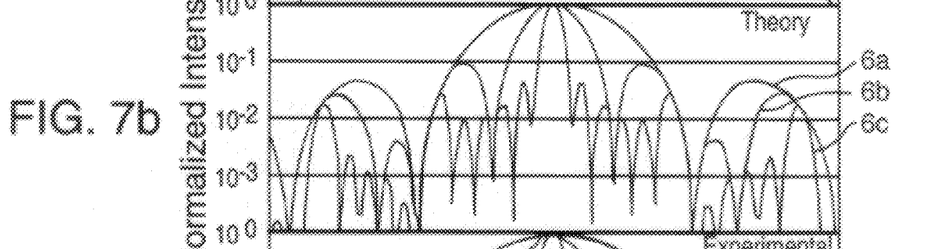
Figure 7C:
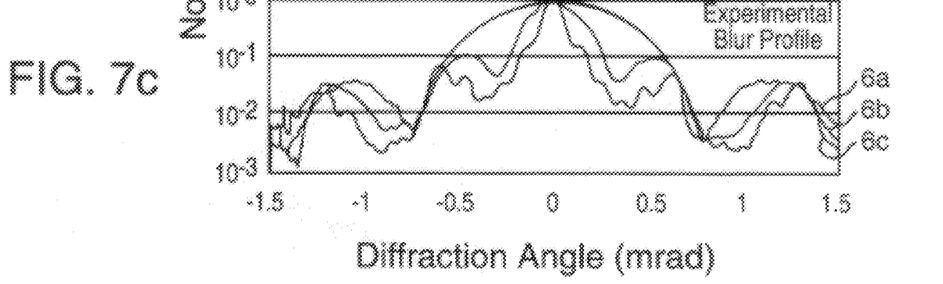

FIGS. 7a–7c quantify the data of FIGS. 6a–6c and compare it to theory. FIG. 7a displays the dependence of intensity on wavelength for FIGS. 6a–6c measured using the set-up shown in FIG. 5. FIG. 7c displays the dependence of intensity on AOTF output angle (it is proportional to distance from the central spot) for FIGS. 6a–6c. These were obtained by taking intensity profiles of images obtained with the CCD 40 of FIG. 4, and are, in effect, measurements of $I^{\theta d}{}_{out}(\theta d)$. According to equation (4), both sets of data should be proportional to the acoustic angle profiles $I_\alpha$, for each of the transducer configurations shown.

FIG. 7b shows calculated results, computed by taking the squared magnitude of the Fourier transform of each transducer profile, taking into account the slice separation of approximately 0.5 mm. The theoretical curves for these three configurations have pronounced differences in center peak width and side-band structure reflecting the differences between their Fourier transforms. These features are also strikingly evident in the experimental data shown in FIG. 7a and 7c. Indeed, the detailed correspondence between measured and calculated results is a remarkable confirmation of equation (4). FIGS. 7a–7c quantitatively demonstrate the effect of transducer structure on the spectral and angular output characteristics of acousto-optic imaging filter 38.

The diffracted intensity distributions shown result in two types of image degradation. The center peak width leads to decreased image resolution, and the sideband structure leads to decreased image contrast. With the quantitative results shown by FIGS. 7a and 7c, however, these effects can now be compensated for using digital image processing techniques. In particular, the curves of FIG. 7c represent intensity profiles of AOTF images of a white light point source. This is, in effect, the measured white light point spread function (psf) for the AOTF in the microscope. Note that this psf is one-dimensional because AOTF blur occurs only along one axis. With this psf, it is straightforward to use computational image processing to deconvolve the effect of the AOTF image blur from the raw images. Expectation-maximization is ideally suited for this task. See, for example, L. A. Shepp and Y. Vardi, "Maximum-likelihood reconstruction for emission tomography," IEEE Trans. Med. Imag. 1, pp 113–121 (1982) and T. Holmes, "Maximum-likelihood image restoration adapted for noncoherent optical imaging," J. Opt. Soc. Am. A 7, pp. 666–673 (1988).

Figure 8A:
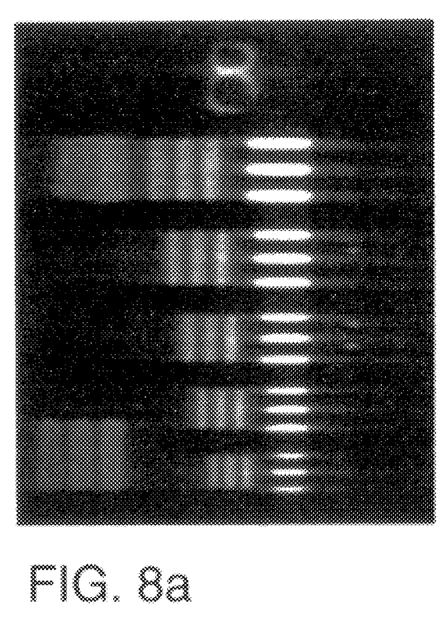
FIGS. 8a and 8b illustrate the effect of image deconvolution on image quality using the standard Air Force resolution target and a transducer length of 1.98 micron shown before (FIG. 8a) and after (FIG. 8b) the convolution.
Figure 8B:
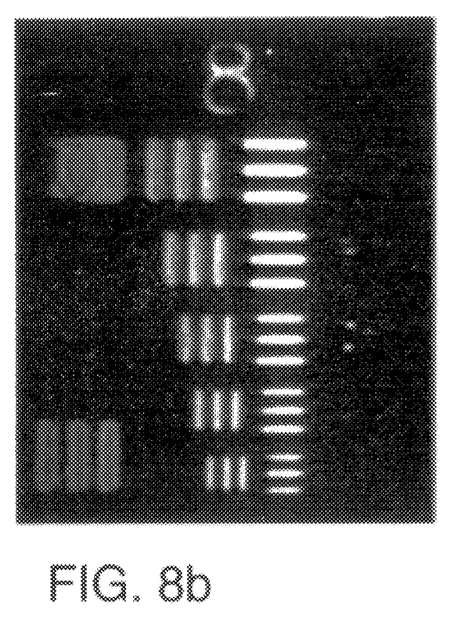

The power of this approach may be seen in FIGS. 8a and 8b. A standard Air Force resolution target (Applied Image) is imaged through the AOTF 38 using white light brightfield illumination with six transducer slices connected. The figure displays Group 8 of this target both before (FIG. 8a) and after (FIG. 8b) processing. AOTF blur is clearly evident in the horizontal direction of the raw image of FIG. 8a. Processing removes much of the sideband-related blur, as well as partially compensating for the width of the central peak of the diffracted intensity distribution. This results in a significant contrast increase in the deconvolved image, as well as a pronounced sharpening of the target lines. The finest pattern at the bottom of the figure consists of 1.1 μm lines and spaces. These are resolved without difficulty.

To resolve even smaller structures and determine more precisely the effectiveness of the deconvolution algorithm, actin fibers in 24-hour serum-deprived 3T3 cells fixed with formaldehyde, stained with rhodamine phalloidin, and mounted in gelvatol were examined. Illumination was provided with the 546 nm line of the one hundred watt mercury lamp. In this case, per equation (3), the white light psf used above must now be multiplied by the actual spectrum of light incident on the AOTF, $I_{inc}$, where:

$$I_{inc}(\lambda) = \eta I_{exc}(\lambda) + I_{fl}(\lambda), \qquad (5)$$

with $I_{exc}$ the spectrum of the excitation light, $I_{fl}$, the fluorescence spectrum of the stained fibers, and $\eta$ a constant indicating the relative magnitude of scattered excitation light to fluorescence at the entrance to the AOTF 38.

Figure 9A:
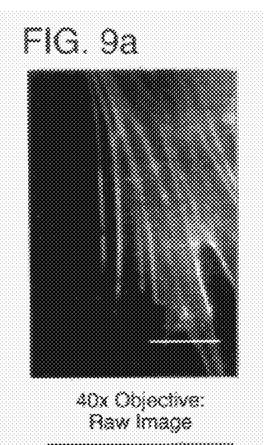
FIGS. 9a, 10a, and 11a are ultra high resolution AOTF images of actin fibers in fluorescence.
Figure 9B:
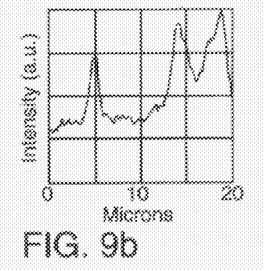
FIGS. 9b, 10b, and 11b are graphs representing line intensity profiles taken along the light lines shown at the bottom right in each of the respective "a" figures.
Figure 10A:
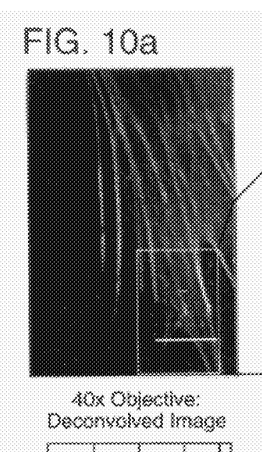
Figure 10B:
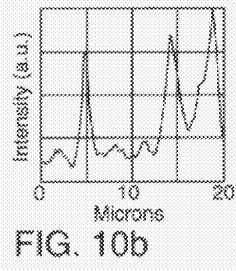

FIGS. 9a and 10a show images of these actin fibers taken with the 40× objective 36 through the AOTF 38 before and after deconvolution, respectively. FIGS. 9b and 10b are intensity profiles taken along the white lines shown in the bottom right corner of each of FIGS. 9a and 10a, respectively. The minimum feature size resolvable in the raw image of FIG. 9a is approximately 1 μm. With deconvolution, resolution is increased to about 0.8 μm, and image contrast is improved approximately threefold. This increased image resolution and contrast may be clearly seen in the intensity profile graphs of FIG. 9b and 10b.

Figure 11A:
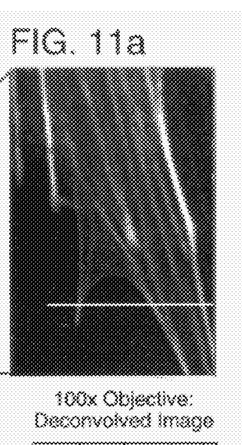
Figure 11B:
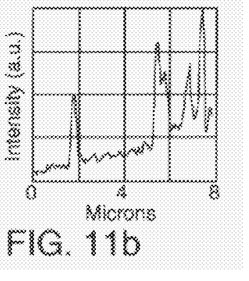

Higher AOTF resolution may be obtained using a 100× objective lens as shown in FIG. 11a. Here, the angular separation of the ray bundles emanating from two points in the sample plane is magnified by a factor of 2.5 relative to the 40× objective lens. As a result, the angular blur introduced by the AOTF, which is independent of objective lens, becomes proportionally less significant. The raw image (not shown) corresponding to the deconvolved image in FIG. 11a, has nearly the same resolution as the processed image, although with several times less contrast. The image shown in FIG. 11a corresponds to that marked by the white rectangle in the lower corner of FIG. 10a. The intensity profile graph shown in FIG. 11b is taken along the same line as in FIGS. 9a and 10a. Features are resolved in the 100× graph of FIG. 11b which are just barely visible in the 40× graph of FIG. 10b. These correspond to a resolution in the 100× image of approximately 0.35 μm, equal to that of a conventional light microscope using mechanical filter wheels.

Conclusions

The three biggest limitations that have thus far restricted the widespread use of AOTFs for imaging spectroscopy are their relatively poor out-of-band rejection, lower throughput (due in part to their polarization selectivity), and their poor imaging quality. The present invention represents a major step in overcoming such limitations. With the superior speed and spectral versatility of the AOTF, the present invention opens up many new and exciting application for AOTFs in high resolution imaging.

Figure 15:
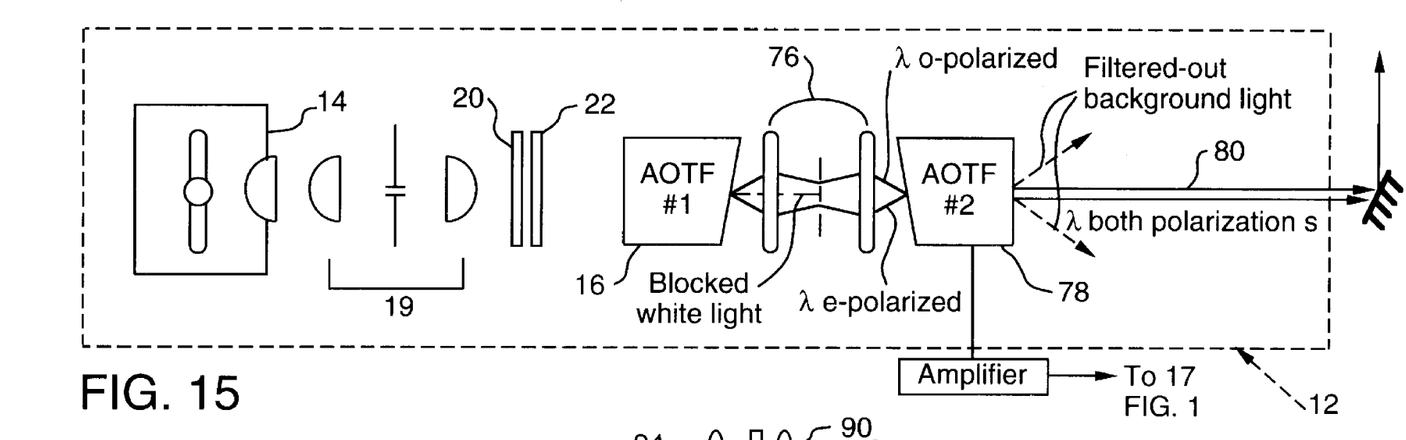
FIG. 15 illustrates an alternative embodiment for the excitation portion of the system illustrated in FIG. 1.

The present invention has been described in conjunction with preferred embodiments thereof. Experimental results have been provided for the purpose of illustration and not limitation. Many modifications and variations of the disclosed embodiments of the apparatus and method will be apparent to those of ordinary skill in the art. For example, FIG. 15 illustrates a modification to the excitation portion 12. In FIG. 15, the collimated light enters AOTF 16 as in FIG. 1. However, the light exiting AOTF 16 is input to spatial filters 76. Following the spatial filters 76 is a second excitation AOTF 78. The spatial filters 76 operate to block the undiffracted white light and to input the two polarizations of the light frequency of interest to the second excitation AOTF 78 in a manner which is opposite to the manner in which they exited from AOTF 16. The result is that the two polarizations exit the second excitation AOTF 78 as a collimated beam 80. Because the collimated beam 80 already contains both polarizations of the light wavelength of interest, optics 24, 25, 26, and 27 from FIG. 1 may be replaced by simpler steering optics.

As has been previously mentioned, AOTFs suffer from poor background rejection. By using a second AOTF, additional excitation light may be lost, but background rejection drops off by a factor of between 50 and 100. Typical parameters for both the AOTF 16 and AOTF 78 may be as indicated in the chart set forth above.

Figure 16:
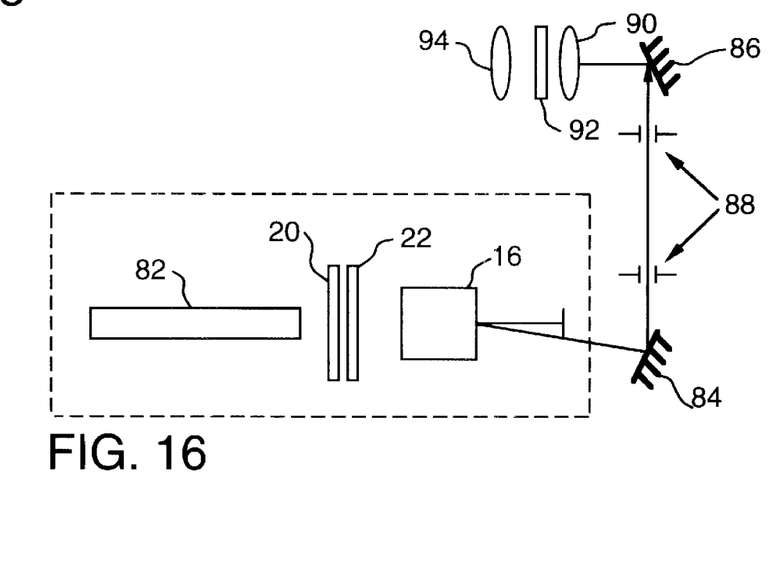
FIG. 16 illustrates a portion of a light microscope constructed according to the teachings of the present invention wherein the light source is a multiline laser.

Another modification to the present invention has been previously mentioned, and that is the use of the multiline laser as the light source 14. FIG. 16 illustrates a portion of a light microscope constructed according to the teachings of the present invention wherein the light source is a multiline laser 82. The multiline laser light 82 is input to the AOTF 16 and the output is directed by steering mirrors 34 and 86 to a focusing lens 90 Because the light source is a multiline laser 82, the need to combine the two polarizations is eliminated such that mirrors 84 and 86 serve only a steering and not a recombination function. Additionally, between mirrors 84 and 86, pin hole openings 88 may be provided as is known for reducing background radiation. From the focusing lens 90, the light passes through a spinning frosted glass 92, as is known in the art, to make the laser beam uniform and incoherent. Thereafter, the light is input to the microscope input optics 94.

Figure 17:
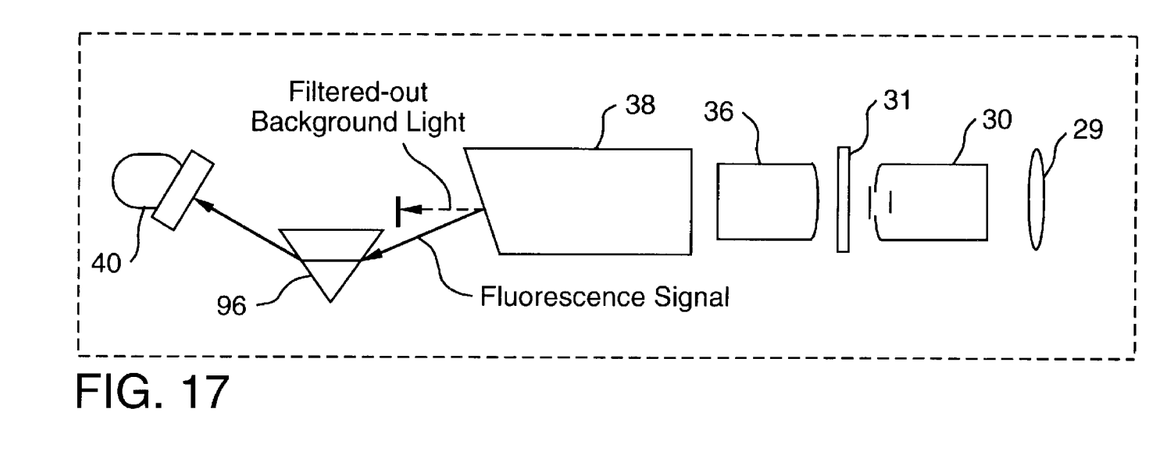
FIGS. 17, 18, and 19 illustrate alternative embodiments for the imaging portion of the system illustrated in FIG. 1.

Modifications to the imaging portion of the system illustrated in FIG. 1 are also possible. One possible modification is illustrated in FIG. 17. In FIG. 17, the output of AOTF 38 is sent through a correction prism 96 into the CCD camera 40. As mentioned, an AOTF acts as EL diffraction grating causing certain frequencies of light to be deflected more than others. As is known, prisms also act to disperse light, but in a direction opposite to those of AOTF's. By proper selection of the angle and material for the correction prism 96, the deflection of the fluorescence's signal caused by the AOTF 38 can be largely compensated for by the correction prism 96, thereby producing an image with greatly enhanced spatial resolution which can then be input to the CCD camera 40. The crystal 38 may be an apodized crystal.

Figure 18:
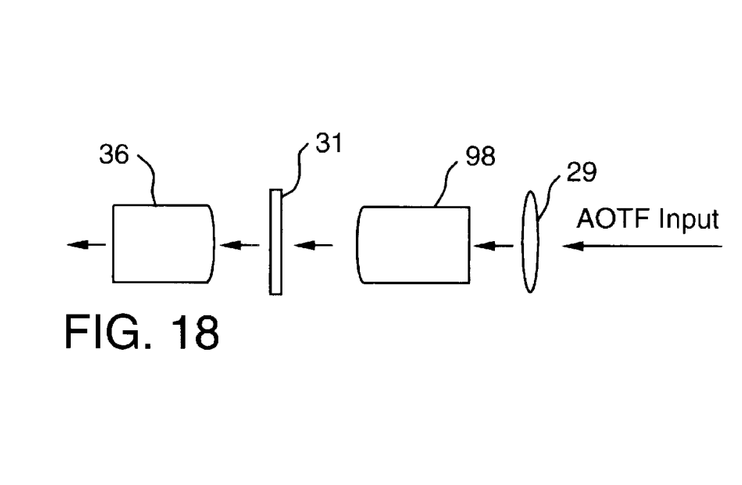

In FIG. 18, another alternative embodiment for the imaging portion of the system illustrated in FIG. 1 is shown. In FIG. 18, it is anticipated that an excitation system of the type illustrated in FIG. 15 or FIG. 16 has been provided. Under those circumstances, rejection of background may be sufficiently high such that excitation illumination may be focused upon the sample 31 by a bright-field condenser 98.

Figure 19:
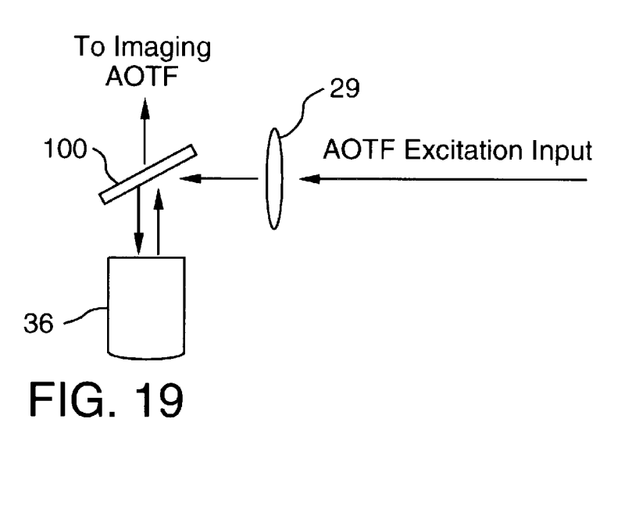

As an alternative to the configuration of FIG. 18, the epi-illumination arrangement of FIG. 19 may be used. As is known, a dichroic beam splitter 100 is provided so that the excitation illumination is delivered by, and the fluorescence signal is collected by, the objective lens 36. The foregoing disclosure and the following claims are intended to cover all such modifications and variations.

What is claimed is:

1. A light microscope, comprising:
    a light source;
    an acousto-optic tunable filter for receiving light from said light source and for producing two light streams of different polorization therefrom;
    a first amplifier for applying a tuning signal to said filter;
    means for combining said two light streams into a combined light stream;
    input optics for focusing said combined light stream onto a sample; and
    imaging means for receiving light from the sample and for producing an image therefrom.

2. The microscope of claim 1 wherein said means for combining includes another acousto-optic tunable filter, said microscope additionally comprising a spatial filter positioned between said acousto-optic tunable filter and said another acousto-optical tunable filter, said another acoustic-optic tunable filter being responsive to a tuning signal output by another amplifier.

3. The microscope of claim 1 wherein said means for combining includes steering optics.

4. The microscope of claim 1 including a dark-field condenser positioned between said input optics and the sample.

5. The microscope of claim 1 wherein said light source includes an arc lamp.

6. The microscope of claim 5 wherein said arc lamp light source includes a xenon lamp having an arc less than 1 millimeter in length.

7. The microscope of claim 1 wherein said acousto-optic tunable filter includes a tellurium dioxide crystal.

8. The microscope of claim 1 additionally comprising control means for applying multiplexed signals to said first amplifier.

9. The microscope of claim 1 additionally comprising an ultraviolet filter interposed between said light source and said tunable filter.

10. The microscope of claim 1 additionally comprising an infrared filter interposed between said light source and said tunable filter.

11. The microscope of claim 1 wherein said imaging means includes:
    an objective lens for receiving the light from the sample and for producing an image therefrom;
    an imaging acousto-optic tunable filter for receiving the image from said objective lens and for filtering the image;
    a second amplifier for applying a tuning signal to said imaging tunable filter; and
    a processor for processing the filtered image.

12. The microscope of claim 11 wherein said processor includes memory means for storing the processed image.

13. The microscope of claim 1 additionally comprising a dichroic beam splitter positioned so that said input optics perform the function of said imaging means.

14. A light microscope, comprising:
a light source;
first and second amplifiers;
a first acousto-optic tunable filter controlled by said first amplifier, said first filter for receiving light from said light source and for producing two light streams of different polarization therefrom;
means for combining said two light streams into a combined light stream;
input optics for focusing said combined light stream;
a platform for holding a sample;
a condenser for receiving said focused combined light stream and for projecting said light stream onto the sample;
output optics for receiving light from the sample and for producing an image therefrom;
a second acousto-optic tunable filter controlled by said second amplifier, said second filter for receiving the image from said output optics; and
a processor for processing the image output from said second acousto-optic tunable filter.

15. The light microscope of claim 14 wherein said means for combining includes another acousto-optic tunable filter, said microscope additionally comprising a spatial filter positioned between said first acousto-optic tunable filter and said another acousto-optic tunable filter, said another acousto-optic tunable filter being controlled by another amplifier.

16. The light microscope of claim 14 wherein said means for combining includes steering optics.

17. The light microscope of claim 14 wherein said light source includes an arc lamp.

18. The light microscope of claim 14 wherein said condenser includes a dark-field condenser.

19. The light microscope of claim 14 wherein said condenser includes a bright-field condenser.

20. The microscope of claim 14 additionally comprising control means for applying multiplexed signals to said first and second amplifiers.

21. A light microscope, comprising:
a laser light source;
a first acousto-optic tunable filter for receiving light from said light source;
a first amplifier for applying a tuning signal to said first filter;
a steering device for receiving light from said acousto-optic tunable filter;
input optics for receiving light from said steering optics and for focusing said light onto a sample;
imaging means for receiving light from the sample and for producing an image therefrom;
a second acousto-optic tunable filter for receiving said image from said imaging means; and
a second amplifier for applying a tuning signal to said second filter.

22. The light microscope of claim 21 wherein said steering device includes steering optics, said light microscope additionally comprising a device having pinhole apertures positioned within an optical path defined by said steering optics for rejecting out of bandwidth radiation.

23. The microscope of claim 21 additionally comprising a dark-field condenser positioned between said input optics and the sample.

24. The microscope of claim 21 additionally comprising a dichroic beam splitter positioned so that said input optics performs the function of said imaging means.

25. The light microscope of claim 21 additionally comprising a bright-field condenser positioned between said input optics and the sample.

26. A light microscope, comprising:
a light source;
first and second amplifiers;
a first acousto-optic tunable filter for receiving light from said light source and for producing two light streams of different polarization therefrom, said first filter being controlled by said first amplifier;
another amplifier;
another acousto-optic, tunable filter for combining said two light streams into a combined light stream, said another acousto-optic tunable filter being controlled by said another amplifier;
input optics for focusing said combined light stream;
a platform for holding a sample;
a condenser for receiving light from said input optics and for illuminating the sample therewith;
output optics for receiving light from the sample and for producing an image therefrom; and
a second acousto-optic tunable filter for receiving said image from said output optics, said second filter being controlled by said second amplifier.

27. The light microscope of claim 26 wherein said condenser is a dark-field condenser.

28. The light microscope of claim 26 wherein said condenser is a bright-field condenser.

29. The microscope of claim 26 additionally comprising a spatial filter positioned between said first acousto-optic tunable filter and said another acousto-optic tunable filter.

30. The microscope of claim 26 wherein said light source includes an arc lamp.

31. The microscope of claim 30 wherein said arc lamp source includes a xenon lamp having an arc less than 1 millimeter in length.

32. The microscope of claim 26 wherein said first, second, and another acousto-optic tunable filters include a tellurium dioxide crystal.

33. The microscope of claim 26 additionally comprising control means for applying multiplexed signals to said amplifiers.

34. The microscope of claim 26 additionally comprising an ultraviolet filter interposed between said light source and said first tunable filter.

35. The microscope of claim 26 additionally comprising an infrared filter interposed between said light source and said first tunable filter.

36. The microscope of claim 26 additionally comprising a processor for receiving the image from said second acousto-optic tunable filter.

37. The microscope of claim 36 wherein said processor includes memory means for storing the processed image.

38. The microscope of claim 26 additionally comprising a dichroic beam splitter positioned so that the function of said input optics and the function of said output optics is performed by the same device.

39. A method of producing an image of a sample, comprising the steps of:
  splitting a light beam into two light streams of different polarization using a first acousto-optic tunable filter;
  combining the two light streams;
  illuminating a sample with the combined light stream; and
  passing fluorescent light from the sample through a lens to produce an image.

40. The method of claim 39 additionally comprising the step of passing light from the lens through a second acousto-optic tunable filter.

41. The method of claim 40 additionally comprising the step of wavelength switching the first and second acousto-optic tunable filters.

42. The method of claim 40 additionally comprising the step of turning the first and second acousto-optic tunable filters on and off to measure time-delayed phenomena.

* * * * *